United States Patent
Kondoh

(10) Patent No.: US 11,122,184 B2
(45) Date of Patent: Sep. 14, 2021

(54) IMAGE FORMING APPARATUS AND DATA PROTECTION METHOD TO AVOID DATA CORRUPTION OR DAMAGE TO A STORAGE DEVICE

(71) Applicant: SHARP KABUSHIKI KAISHA, Sakai (JP)

(72) Inventor: Yoshikazu Kondoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/936,225

(22) Filed: Jul. 22, 2020

(65) Prior Publication Data

US 2021/0029267 A1 Jan. 28, 2021

(30) Foreign Application Priority Data

Jul. 26, 2019 (JP) .............................. JP2019-137884

(51) Int. Cl.
*H04N 1/00* (2006.01)
*G06F 21/60* (2013.01)
*H04N 1/32* (2006.01)

(52) U.S. Cl.
CPC ....... *H04N 1/32101* (2013.01); *G06F 21/608* (2013.01); *H04N 1/00514* (2013.01); *H04N 1/00891* (2013.01)

(58) Field of Classification Search
CPC ........... H04N 1/32101; H04N 1/00891; H04N 1/00514; G06F 21/608
See application file for complete search history.

(56) References Cited

U.S. PATENT DOCUMENTS

| | | | |
|---|---|---|---|
| 9,886,078 B2 * | 2/2018 | Kawano | G06K 15/4055 |
| 2009/0284913 A1 * | 11/2009 | Wakabayashi | H04L 1/0083 361/679.54 |
| 2013/0063778 A1 * | 3/2013 | Nagasawa | H04N 1/00891 358/1.15 |
| 2015/0278665 A1 * | 10/2015 | Imamura | G06K 15/4055 358/1.14 |
| 2015/0310320 A1 * | 10/2015 | Yamaguchi | H04N 1/00891 358/1.13 |
| 2018/0004387 A1 * | 1/2018 | Ochi | H04N 1/00891 |
| 2018/0063349 A1 * | 3/2018 | Ohata | H04N 1/00891 |

FOREIGN PATENT DOCUMENTS

JP 2009-093408 A 4/2009

* cited by examiner

*Primary Examiner* — Juan M Guillermety
(74) *Attorney, Agent, or Firm* — ScienBiziP, P.C.

(57) ABSTRACT

An image forming apparatus including a storage device storing, from among data to be retained when the power is shut off, either or both of important protection data, being a type determined to be important in advance, and protection data, to be retained when the power is shut off other than the important protection data, at respective predetermined timings. A detection information acquirer receives detection information from a sensor detecting at least one of: a change in either or both of direction and tilt, vibration, a predetermined operation, an approaching person, a person entering a room, and a person entering a predetermined area. A protection processor starts processing for writing either or both of the important protection data and the protection data into the storage device in response to the detection information received by the detection information acquirer, at timings different from the predetermined timings.

6 Claims, 8 Drawing Sheets

IMAGE FORMING APPARATUS AND DATA PROTECTION METHOD TO AVOID DATA CORRUPTION OR DAMAGE TO A STORAGE DEVICE

BACKGROUND OF THE INVENTION

Field of the Invention

The present invention relates to an image forming apparatus including a storage device, and more particularly, to an image forming apparatus which is configured to avoid data corruption or damage to the storage device when power is shut off or vibration is applied during access to the storage device.

Description of the Background Art

A digital multifunction peripheral (alternatively referred to as a multifunction peripheral, or MFP) that executes image forming processing includes a writable non-volatile storage device (also referred to as a memory) to store image data, data in a billing counter and various management counters, and the like.

An electrically erasable programmable read-only memory (ROM) or electrically erasable programmable read-only memory (EEPROM) may be applied as a non-volatile storage device that stores important data such as data in a billing counter although the storage device has a limited data capacity. However, the image data, the management counter data, and the like are a large capacity of data. Therefore, a hard disk drive (HDD) is generally used as a non-volatile storage device having a large capacity and a low bit unit price.

However, when the power for the HDD is shut off during the access to the HDD, there is a possibility that data may be corrupted, the disk itself may be damaged, and eventually the HDD may fail. Further, when vibration is applied during the access to the HDD, data writing may be interrupted, and data may be corrupted or the HDD itself may be damaged (fail).

The HDD is generally widely used as a storage device for storing data for a personal computer (PC), and is also widely used for a small and lightweight PC with a notebook type or a desktop type other than a mobile PC that is designed to be portable. Therefore, users have known that the HDD is vulnerable to vibration by instructions and the like, and general users have known that the HDD is installed in the PC.

Compared to the PC, the MFP is a device that is heavy in weight and is not supposed to be moved. Therefore, the general users have not known that the HDD is installed in the MFP. However, the MFP is an apparatus that can be regarded as essential in a general office as similar to the PC. The MFP is also installed in an environment operated by a large number of unspecified persons, such as convenience stores. The storage device used for the MFP stores important data that may be irreversible once damaged and may cause trouble with users, such as counter data that serves as a basis for billing and various data related to the counter data.

However, a user who does not have sufficient knowledge for handling is likely to roughly deal with the MFP. For example, the user may move the MFP even while the MFP is in operation, in order to clean the floor or the like. The alternating current (AC) power cable of the MFP may be pulled due to the movement, and the plug of the AC power cable may be pulled out from the AC power outlet.

As a countermeasure to such an accident, it is conceivable to apply a storage device that is resistant to vibration instead of the HDD. For example, the above-mentioned EEPROM and a solid-state drive (SSD), which has become popular in recent years, are more resistant to vibration than the HDD. Further, the power supply circuit used in the MFP is designed to have a power storage function so that the circuit operates while storing data even if the power is shut off during the access as long as the data has a limited size.

However, as the functions of the MFP becomes more sophisticated, the data size of various counters or the like tends to increase in recent years. The fact that the power supply circuit has sufficient power storage capacity so that the circuit operates until all the data is stored results in a large cost burden. However, if the power storage capacity is reduced, the risk of data corruption or damage to the storage device increases.

As to the protection of data and storage devices, there has been known an image processing apparatus that stops writing data into a memory when a hand approaching to a main power switch is detected during writing the data into the memory (for example, see Japanese Patent Laid-Open No. 2009-093408).

According to the method illustrated in the patent document, it is possible to prevent a problem in which the write data is not guaranteed and a physical failure of the memory when the power is shut off by operating the main power switch. However, it is not a countermeasure against the vibration and the disconnection of the power plug. Further, the write data is guaranteed by stopping writing data. However, since the writing is stopped, the power is shut off while the data is not written into the memory. That is, the opportunity for data writing is missed.

Problem to be Solved by the Invention

An event such as the power shutdown by operating the main power switch, and the power shutdown due to the vibration and the disconnection of the power plug caused by moving the apparatus, may be mainly caused by people. Therefore, there is a possibility that the event may be predicted in advance.

The present invention has been made in consideration of the above-described circumstances, and predicts occurrence of an event such as vibration caused by power shutdown or the movement of an apparatus to avoid data corruption or damage to a storage, thereby reducing a risk for the data or the storage device to be corrupted or damaged.

SUMMARY OF THE INVENTION

The present invention provides an image forming apparatus, which includes a storage device that stores, from among data to be retained when the power is shut off, either or both of important protection data, being a type determined to be important in advance, and protection data to be retained when the power is shut off other than the important protection data, at respective predetermined timings; a detection information acquirer that receives detection information from a sensor that detects at least one of a change in either or both of direction and tilt, vibration, a predetermined operation, an approaching person, a person entering a room, and a person entering a predetermined area; and a protection processor that starts processing for writing either or both of the important protection data and the protection data into the storage device in response to the detection information received by the detection information acquirer, at timings different from the predetermined timings.

Further, from another aspect, the present invention provides a data protection method such that a controller for an image forming apparatus writes, from among data to be retained when the power is shut off, either or both of important protection data, being a type determined to be important in advance, and protection data to be retained when the power is shut off other than the important protection data, into a storage device, at respective predetermined timings; receives detection information from a sensor that detects at least one of a change in either or both of direction and tilt, vibration, a predetermined operation, an approaching person, a person entering a room, and a person entering a predetermined area; and starts processing for writing either or both of the important protection data and the protection data into the storage device responsive to the detection information received by the detection information acquirer, at timings different from the predetermined timings.

The image forming apparatus according to the present invention includes the protection processor that starts processing for writing either or both of important protection data and protection data into the storage device in response to the detection information received by the detection information acquirer. Therefore, the image forming apparatus according to the present invention predicts the occurrence of an event such as power shutdown or vibration caused by the movement of the apparatus, and executes processing for avoiding data corruption or damage to the storage, thereby reducing a risk for the data or the storage device to be corrupted or damaged.

The same applies to a data protection method according to the present invention.

DESCRIPTION OF THE PREFERRED EMBODIMENTS

Hereinafter, the present invention will be described in more detail with reference to the drawings. Note that the following description is illustrative in all respects and should not be construed as limiting the present invention.

First Embodiment

MFP Configuration

Figure 1:
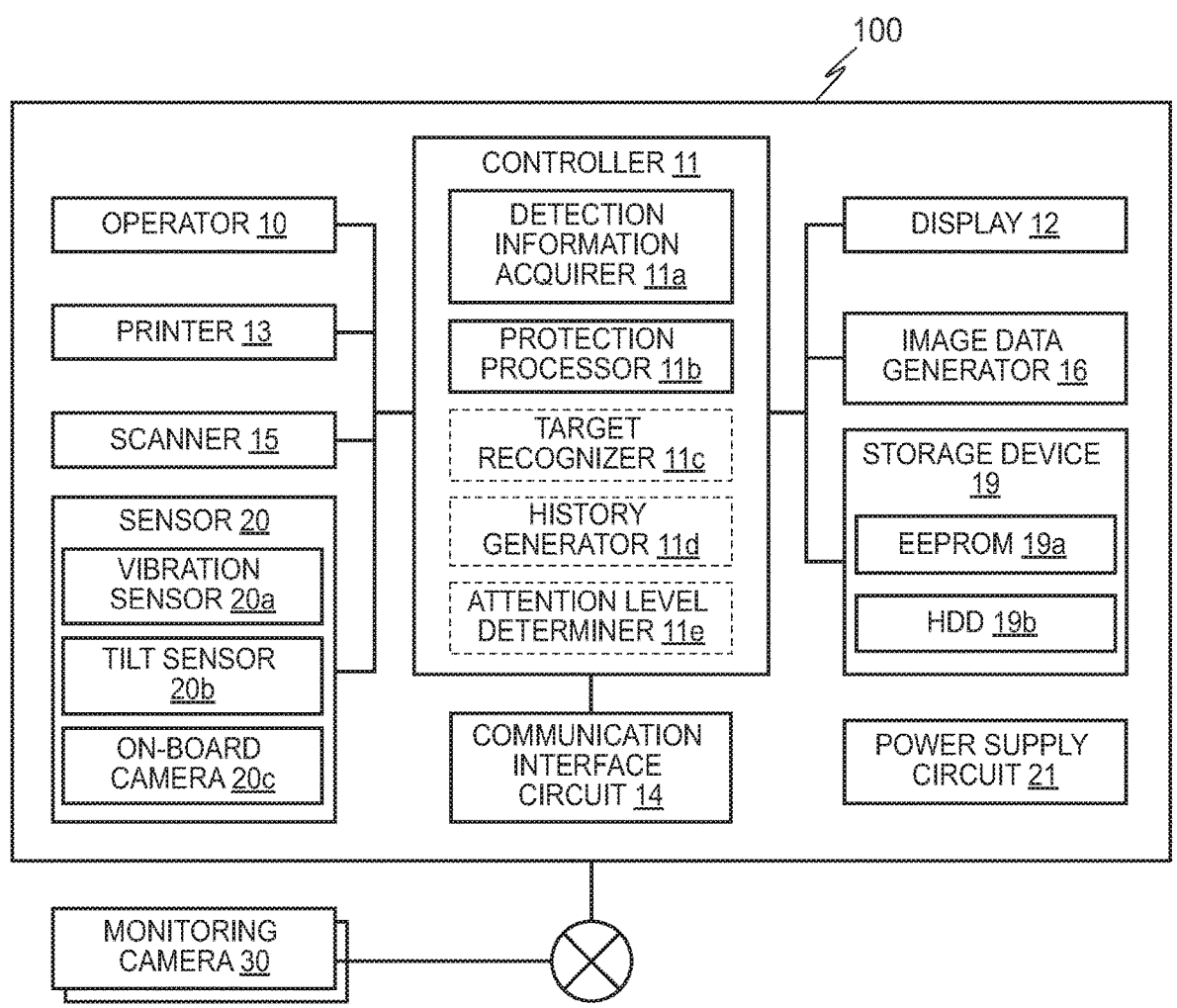
FIG. 1 is a block diagram illustrating a configuration of an MFP according to a present embodiment.
Figure 2:
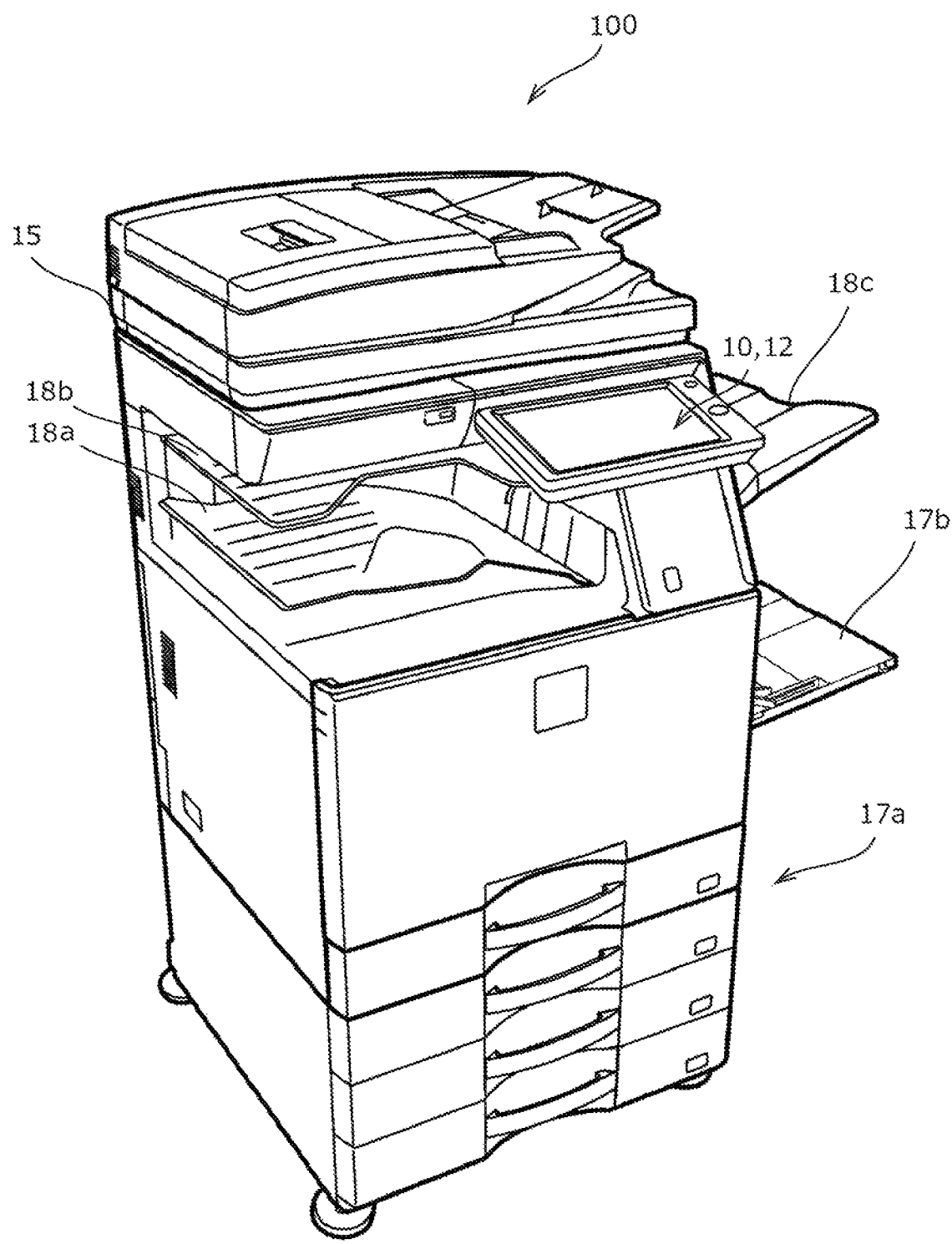
FIG. 2 is a perspective view illustrating an outer appearance of the MFP 100 in FIG. 1.

FIG. 1 is a block diagram illustrating a configuration of a digital multifunction peripheral (MFP) which is an aspect of an image forming apparatus according to a present embodiment. FIG. 2 is a perspective view illustrating an outer appearance of the MFP 100 in FIG. 1.

Note that, although the MFP 100 is described as an example of an image forming apparatus according to the present embodiment, the image forming apparatus is not limited to the example. For example, the image forming apparatus may be a scanner device, a copy device, a facsimile device, a printer device, or the like. Further, the image forming apparatus is not limited to these devices as long as the image forming apparatus is an apparatus related to image formation.

As illustrated in FIG. 1, the MFP 100 includes an operator 10, a controller 11, a display 12, a printer 13, a communication interface circuit 14, a scanner 15, an image data generator 16, a storage device 19, a sensor 20, and a power supply circuit 21. Further, the MFP 100 may be coupled to an external sensor (FIG. 1 illustrates a monitoring camera 30 as an example) via the communication interface circuit 14. The monitoring camera 30 captures the surroundings of the MFP 100, and provides the MFP 100 with detection information. It is noted that the configuration in which the MFP 100 acquires the detection information from the external sensor is a preferable aspect and is not an essential configuration. That is, a configuration in which only the sensor 20 is used can also be adopted. On the contrary, it is also possible to adopt a configuration in which only the external sensor is provided without including the sensor 20. Further, the external sensor is not limited to the monitoring camera 30. For example, the external sensor may be a human detecting sensor, and may be a card reader or the like used in a security system that recognizes an identification card necessary for entering a room in which the MFP 100 is installed.

As illustrated in FIG. 2, the MFP 100 includes a sheet feed tray 17a, discharge trays 18a, 18b and 18c, and a manual feed tray 17b.

The controller 11 is coupled to the printer 13 and the scanner 15 via a bus, and the printer 13 and the scanner 15 can communicate with each other.

The controller 11 controls the operation of each unit in the MFP 100 in FIG. 1. More specifically, the controller 11 is configured by hardware resources such as a central processing unit or micro processing unit (hereinafter, both are collectively referred to as a CPU which is a main part, a memory, an input and output interface circuit, and a timer circuit. At least a part of the read-only memory (ROM) in the controller 11 may be a rewritable non-volatile memory. The CPU in the controller 11 reads a control program stored in the ROM, and appropriately deploys the control program on the random access memory (RAM). Then, the CPU executes processing in accordance with the control program deployed in the RAM.

The CPU displays display related to the user interface on the display 12 according to the contents of the control program stored in the ROM. Then, the CPU receives an operation input, which is input by a user on the operator 10. Further, the CPU controls the hardware of the MFP 100 according to the control program to realize a function such as print processing.

The controller 11 includes a detection information acquirer 11a, a protection processor 11b, a target recognizer 11c, a history generator 11d, and an attention level determiner 11e. The CPU executes the control program stored in the ROM, thereby realizing the functions of the detection information acquirer 11a, the protection processor 11b, the target recognizer 11c, the history generator 11d, and the attention level determiner 11e.

Note that the basic configuration of the present embodiment does not include the target recognizer 11c, the history generator 11d, and the attention level determiner 11e. The target recognizer 11c, the history generator 11d, and the attention level determiner 11e are not essential components, and are provided as a preferred embodiment.

The detection information acquirer 11a obtains detection information from the sensor 20 or the monitoring camera 30 which is an external sensor.

The protection processor 11b executes protection processing for important protection data and protection data. Further, the protection processor 11b executes protection processing for the storage device 19. As a preferred aspect, the protection processor 11b executes protection processing for the MFP 100.

That is, the protection processor 11b predicts that the MFP 100 will be vibrated or the power will be shut off, based on the detection information from the sensor 20 or the monitoring camera 30 as an external sensor, and starts processing for writing either or both of the important protection data and the protection data into the storage device. The protection processor 11b completes to write data before the MFP 100 is vibrated or the power is shut off to reduce the risk that the data or the storage device will be corrupted or damaged.

Here, the important protection data is data related to billing to a user based on the use of the MFP 100. More specifically, the important protection data is counter data indicating the total number of sheets or the number of sheets for each user (including each department), and the like, which are used by the MFP 100.

According to the present embodiment, it is assumed that the important protection data is stored in an EEPROM 19a. However, the present embodiment is not limited to this example. For example, at least a part of the important protection data may be stored in an HDD 19b.

The data capacity that can be stored in the EEPROM 19a is smaller than the data capacity that can be stored in the HDD 19b. However, the power supply circuit 21, which will be described later, has a sufficient power storage capacity to ensure the operation of the circuit during the processing for writing the important protection data into the EEPROM 19a even when the power from the system power is shut off.

The protection data is data to be held in a rewritable manner, other than the important protection data related to billing. The protection data according to the present embodiment includes state related protection data, and configuration related protection data. The state related protection data is data relating to the usage state of the MFP 100. More specifically, the state related protection data is, for example, data such as a counter for managing the replacement time of consumables and periodic replacement parts used for the MFP 100. The configuration related protection data is data related to a configuration of the image quality, the operation timing, the user interface, or the like of the MFP 100.

According to the present embodiment, the protection data is stored in the HDD 19b. However, the present embodiment is not limited to this. For example, at least a part of the protection data may be stored in the EEPROM 19a.

The target recognizer 11c, the history generator 11d, and the attention level determiner 11e will be described in a second embodiment.

The operator 10 is provided on the housing of the MFP 100, and is configured by a plurality of operation buttons for receiving a user operation, a touch panel disposed on the surface of the display 12, and the like. The controller 11 recognizes a signal indicating an input operation to the operator 10.

The display 12 is configured by a liquid crystal display device, for example. The display 12 can display various types of information, images, and the like, based on the input received by the operator 10, for example. The controller 11 generates and updates the contents to be displayed on the display 12. Accordingly, the display 12 displays various types of information and images.

The controller 11 is coupled to the scanner 15, which reads a document image.

The scanner 15 scans an image in a job of copying, facsimileing or scanning under the control of the controller 11, and form an image. That is, the scanner 15 reads a document image, converts the document image into an image signal, and generates image data.

The image data generator 16 generates image data based on the image signal output by the scanner 15.

The storage device 19 is a rewritable non-volatile memory, which stores important protection data and protection data. Further, the storage device 19 stores image data. According to the present embodiment, the storage device 19 is configured by the EEPROM 19a and the HDD 19b. The EEPROM 19a stores important protection data. The HDD 19b stores protection data and image data. However, the configuration of the storage device 19 is not limited to the configuration illustrated in FIG. 1. That is, the storage device 19 is not limited to the two kinds of the non-volatile memories, and may have one type or three or more types of the non-volatile memories. Further, another type of the non-volatile memory may be applied.

The sensor 20 detects a state or an operation in which vibration is applied to the MFP 100, the power is shut off, or any of the events is expected, to provide detection information. According to the present embodiment, the sensor 20 is configured by a vibration sensor 20a, a tilt sensor 20b, and an on-board camera 20c which is an image sensor. However, the sensor 20 is not limited to the configuration illustrated in FIG. 1. For example, another type of sensor may be applied, such as a human detecting sensor detecting the presence of a person in the surroundings. Further, the sensor 20 is not limited to the three types of the sensors, and may have one, two, or four or more types of sensors. Further, only an external sensor without including the sensor 20 may be provided.

The power supply circuit 21 receives power from the system power via a power plug (not illustrated), and supplies power necessary for the operation to the respective units in the MFP 100 in FIG. 1, including the controller 11 and the storage device 19. When the power from the system power is shut off due to a power outage (including an instantaneous power outage) or a power plug disconnection, the controller 11 as the detection information acquirer 11a acquires detection information indicating the power shutdown, and promptly writes important protection data into the EEPROM 19a. The power supply circuit 21 accumulates sufficient energy to ensure the operation of the controller 11 and the storage device 19 related to the writing processing, during the period until the processing for writing data to the EEPROM 19a is completed even if the power is shut off.

However, the power supply circuit 21 does not accumulate energy enough to write all the protection data into the HDD 19b, and does not ensure the completion of writing image data.

The power from the system power is not shut off by the normal shutdown for which the user turns off a power switch (not illustrated). Therefore, the normal shutdown for which the power switch is turned off different from the shut off of the power, from the viewpoint that the processing can be sequentially completed over time.

The sheet feed tray 17a is configured by a plurality of trays for individually accommodating sheets of various sizes.

The manual feed tray 17b is a tray that can feed sheets of various sizes and types.

A sheet feed mechanism, which is not illustrated in FIGS. 1 and 2, feeds a sheet in a designated paper feed tray, and conveys the sheet to the printer 13, under the control of the controller 11.

Under the control of the controller 11, the printer 13 prints the designated image data on the sheet fed from the sheet feed tray 17a or the manual feed tray 17b to form an image. According to the present embodiment, the printer 13 is an electrophotographic apparatus, and forms a toner image for printing on an electrophotographic photosensitive member, and transfers the toner image to a sheet. Then, the printer 13 conveys the sheet on which the toner image is transferred to a fixing unit, which is not illustrated, and thermally fixes the toner on the sheet.

A paper discharge mechanism, which is not illustrated in FIGS. 1 and 2, discharges the sheet printed by the printer 13 to any of the discharge trays 18a, 18b, and 18c.

The communication interface circuit 14 is an interface for communicating data with an external device via a network. According to the present embodiment, the MFP 100 communicates with the monitoring camera 30 connected via the network. The number of monitoring cameras 30 is not limited to one, and may be two or more.

Note that, in FIG. 1, the detection information acquirer 11a, and the protection processor 11b is included in the controller 11 of the MFP 100. However, as a modified example, it is possible to adopt a configuration in which the detection information acquirer 11a, and the protection processor 11b are provided in an external device connected via the communication interface circuit 14, and the controller 11 obtains information from the external device and executes the protection processing of the MFP 100. The target recognizer 11c, the history generator 11d, and the attention level determiner 11e may also have the similar configuration.

Data and Storage Device Protection

According to the present embodiment, the protection processor 11b detects that the MFP 100 has been moved, and preferably also how the MFP 100 has been moved, and executes processing for writing data into the storage device 19 based on the detection.

For example, a user may move the MFP 100 for cleaning the back of the MFP 100 or the like.

Generally, the user's recognition that the MFP 100 includes a precision component (for example, HDD), similarly to a PC, is weaker than the user's recognition to the PC. The recognition of an office user who uses the MFP 100 in the office on a daily basis, a sales clerk of a convenience store in which the MFP 100 is installed, or an administrator of the MFP 100 is likely to be weaker than the user's recognition to the PC. Therefore, in the case of the cleaning described above, the MFP 100 may be moved in the energized state without executing the operation for shutting off the power. The movement may cause tilt or vibration during the operation of the MFP 100.

According to the present embodiment, the MFP 100 detects vibration accompanying the movement by the vibration sensor 20a. Further, the MFP 100 detects a change in the tilt due to the MFP 100 passing a step or a slope, for example, by the tilt sensor 20b.

When the vibration sensor 20a detects vibration at the start of movement, the detection information acquirer 11a acquires detection information from the vibration sensor 20a. Further, when the MFP 100 passes a step or the like, the detection information acquirer 11a acquires the detection information from the tilt sensor 20b. When the detection information acquirer 11a determines that vibration is applied to the HDD 19b based on the detection information, the protection processor 11b executes processing according to the magnitude and type of the expected vibration.

For example, the protection processor 11b writes protection data into the HDD 19b, and writes important protection data into the EEPROM 19a. The protection processor 11b gives priority to the processing for writing the important protection data into the EEPROM 19a when there is no time. After the protection processor 11b completes to write the protection data into the HDD 19b, the protection processor 11b immediately stops the disk of the HDD 19b.

Further, when the vibration continues beyond a predetermined period, there is a possibility that the amount of the movement is large, the power cable is pulled off, the power plug is pulled out, and the power to the MFP 100 is shut off. Therefore, the protection processor 11b shuts down to prevent data corruption, disk damage, and eventually damage to the MFP 100 due to the shut off.

Flow of Protection Processing

Figure 3:
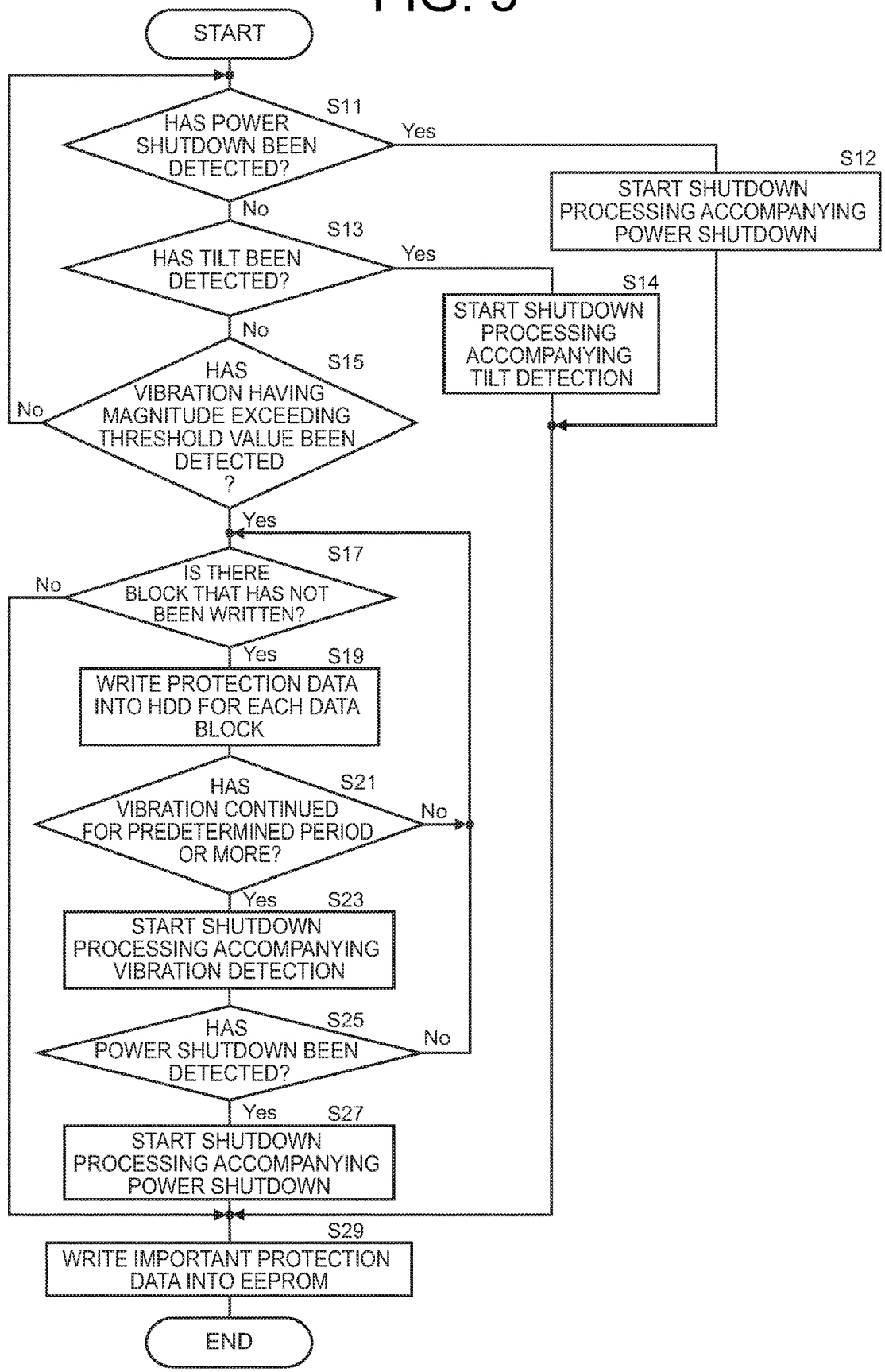
FIG. 3 is a flowchart illustrating an example of protection processing executed by a controller according to a first embodiment.

FIG. 3 is a flowchart illustrating an example of a flow of protection processing executed by the controller 11 according to the present embodiment. Note that the protection processing illustrated in FIG. 3 is multitasked as one task in parallel with other tasks. FIGS. 4, 5, 6, 7 and 8, which will be described later, also execute multitasking processing as in FIG. 3.

As illustrated in FIG. 3, the controller 11 as the detection information acquirer 11a determines whether power shutdown has been detected (step S11). Here, the power shutdown occurs by an instantaneous power failure, the disconnection of the power plug, or the like, and is a phenomenon different from the normal power off by operating the power switch.

When the power has been shut off, the controller 11 as the protection processor 11b starts shutdown processing accompanying the power shutdown (step S12). When the power has been shut off, it is necessary to complete the shutdown processing within a limited period corresponding to the power storage capacity of the power supply circuit 21. Therefore, the main processing of the shutdown executed in this case is processing saving the important protection data. The controller 11 writes the important protection data into the EEPROM 19a.

Here, the number of writable times of the EEPROM 19a has an upper limit due to the life of the elements (1 million times in an example). Therefore, the controller 11 reads the counter data relating to the billing which is the important protection data, from the EEPROM 19a in the initialization processing after the power is turned on, generates an image of the important protection data on the RAM, and executes the frequent update of the data on the generated image. That is, when the important protection data is updated during the image forming operation, the controller 11 updates the image on the RAM rather than the data stored in the EEPROM 19a.

Further, the controller 11 writes the image on the RAM updated at a predetermined interval (for example, every ten times the important protection is updated) into the EEPROM 19a, and updates the important protection data stored in the EEPROM 19a. In addition, the controller 11 writes the image on the RAM into the EEPROM 19a even when the power is turned off. Since the image data on the RAM is erased due to the power off, the image data on the RAM is written into the EEPROM 19a before the image data is erased. In the case of the shutdown, similarly to the power-off, the controller 11 as the protection processor 11b writes the image on the RAM into the EEPROM 19a (step S29), and ends the processing.

The controller 11 as the protection processor 11b stops outputting an output signal that may damage the MFP 100 unless the output is turned off immediately, as the shutdown processing accompanying the power shutdown, in addition to the above-mentioned processing for writing the protection data into the EEPROM 19a. For example, the controller 11 retracts the head of the HDD 19b, and stops the disk. Further, the controller 11 may turn off a heater (not illustrated in FIG. 1), which is a heat source for the fixing device. After the OFF processing, a hardware reset signal is sent to the CPU in the controller 11, and the controller 11 stops the CPU. The runaway of the CPU is prevented when the output of the power supply circuit 21 drops below the rated voltage.

On the other hand, when the power shutdown has not been detected in step S11 (No in step S11), the controller 11 as the detection information acquirer 11a subsequently determines whether the tilt sensor 20b has detected a change in tilt (step S13). When the controller 11 has detected a change in tilt, the controller 11 as the protection processor 11b determines that the MFP 100 may be significantly impacted, and executes the shutdown processing accompanying the tilt detection (step S14).

The shutdown processing accompanying the tilt detection is processing for writing the protection data into the EEPROM 19a in the same manner as the shutdown processing accompanying the power shutdown. Further, the controller 11 stop outputting an output signal that may damage the MFP 100 unless the output is turned off. The shutdown processing accompanying the tilt detection differs from the shutdown accompanying the above power shutdown from the point of view that the power is not immediately shut off. Therefore, the controller 11 also executes output off processing that requires some period before an operation stops. For example, the controller 11 may immediately stop a scanning motor in the scanner 15, not illustrated in FIG. 15, to stop the operation of the scanner. Further, the controller 11 may turn off a high-voltage output such as charging, developing bias, transfer according to electrophotographic processing in accordance with a predetermined timing, in order to suppress damage to the photoreceptor and the developer.

Further, although not illustrated in FIG. 3, when the change in tilt of the MFP 100 is smaller than a predetermined reference, the controller 11 may continue to execute the print job until the printing on the sheet in progress is completed, and then stop the print job. By doing this, the MFP 100 does not stop in a state in which the sheet in progress is held in the MFP 100. Therefore, it is not necessary for the user to remove the sheet in the MFP 100 when resuming the operation.

When no tilt is detected in step S13 (No in step S13), then, the controller 11 as the detection information acquirer 11a determines whether the vibration sensor 20a has detected vibration having a magnitude exceeding a predetermined threshold value (step S15). Since slight vibration occurs in accordance with the normal operation of the MFP 100, the threshold value is set so as to prevent an erroneous determination based on the vibration accompanying the normal operation.

When the controller 11 has not detect the vibration exceeding the threshold value (No in step S15), the controller 11 as the detection information acquirer 11a repeats monitoring of the power shutdown (step S11), the tilt detection (step S13), and the vibration detection (step S15).

When the controller 11 has detected the vibration exceeding the threshold value (Yes in step S15), the controller 11 as the protection processor 11b executes processing for writing protection data for the device and data protection for the HDD 19b, which is vulnerable to the vibration (steps S17 to S27). According to the present embodiment, it is assumed that the data size of the protection data is much r than the data size of the important protection data, and it takes time to write the protection data into the HDD 19b. Therefore, it is assumed that the controller 11 divides the protection data into a plurality of data blocks in advance, and only writes the data block including updated data into the HDD 19b. Further, since it takes time to write, the image may be provided on the RAM, and the update may be executed on the image each time, and the protection data may be written into the HDD 19b at a predetermined interval, similarly to the important protection data. In this case, in the shutdown accompanying the vibration detection, after writing the protection data into the HDD 19b, the controller 11 writes, into the HDD 19b, the data block including the protection data for which the image has been updated.

The controller 11 determines whether there is a data block that has not been written among the protection data to be written into the HDD 19b (step S17). When there is no data block to be written (NO in step S17), the controller 11 subsequently writes the important protection data into the EEPROM (step S29), and ends the processing.

On the other hand, when there is an unwritten data block (Yes in step S17), the controller 11 writes the next data block into the HDD 19b (step S19). Then, the controller 11 determines whether the vibration has continued for a predetermined period or more (step S21).

When the vibration does not continue (No in step S21), the routine returns to step S17 described above, and the controller 11 determines whether an unwritten data block remains. That is, when the controller 11 determines that the movement amount is small, the shutdown processing is not executed, and the controller 11 only writes the protection data and the important protection data.

On the other hand, when the vibration continues for a predetermined period or longer (Yes in step S21), the controller 11 starts the shutdown processing accompanying the vibration detection (step S23).

The shutdown processing accompanying the vibration detection includes an output off processing that requires time until the operation stops, in addition to the shutdown processing accompanying the tilt detection. For example, the print job may be continuously executed until the printing on the in-progress sheet is completed, and then the print job may be stopped. By doing so, the MFP 100 does not stop the operation while the sheet remains in the MFP 100. Therefore, it is not necessary for the user to remove the sheet in the MFP 100 when resuming the operation.

Here, when the vibration continues long, there is a possibility that the MFP 100 may travel a long distance, and the power cable may be inadvertently pulled off during the movement so that the power plug may be pull out. According to the present embodiment, in consideration of the possibility, the controller 11 determines whether the power shutdown has been detected even during the execution of the shutdown processing accompanying the vibration detection (step S25).

When the controller 11 has not detected the power shutdown (No in step S25), the routine returns to step S17, and the controller 11 determines whether there is an unwritten data block, and continues to write the protection data into the HDD 19b.

On the other hand, when the power shutdown has been detected during the processing for writing the data block into the HDD 19b (Yes in step S25), the power is shut off by pulling out the power plug. Therefore, as in step S12 described above, the controller 11 executes the shutdown processing accompanying the power shutdown (step S27). Then, the controller 11 writes the important protection data into the EEPROM 19a (step S29). When there is an unwritten data block, the controller 11 preferentially processes the important protection data although the data block has a discrepancy in the protection data.

Note that, in the above description, the tilt sensor 20b detects tilt, and the vibration sensor 20a detects vibration. However, the tilt and vibration may be detected by other methods. For example, the on-board camera 20c may be used to detect the tilt, the vibration, or the movement based on a change in tilt, blur, or shift of a captured image.

Second Embodiment

According to the first embodiment, the actual vibration or tilt applied to the MFP 100 is detected. According to the present embodiment, the protection processing is executed from an earlier stage by recognizing a target that may add vibration or tilt to the MFP 100. The method according to the present embodiment may be combined with the first embodiment. The embodiments described below may be combined with other embodiments within a reasonable range.

More specifically, according to the present embodiment, the controller 11 recognizes as a target a person who is approaching the MFP 100 or has approached the MFP 100 (including a store clerk, for example, when the MFP 100 is installed in a store such as a convenience store). Then, the controller 11 stores the presence or absence of behavior in which the recognized target moves the MFP 100 or shuts off the power without executing the normal power-off operation, or which is estimated to do so, as a behavior history for each target. Then, the controller 11 determines the necessity and the degree of the protection processing on the basis of the behavior history stored for the recognized target object.

For example, in case that a target approaching the MFP 100 is recognized and his or her operation of the MFP 100 is rough or gives vibration frequently, based on the behavior history of the target, the controller 11 as the attention level determiner 11e determines that a behavioral attention level of the target is high. In this case, the controller 11 executes processing for writing the protection data and the important protection data while the target is approaching. Further, the controller 11 shifts the MFP 100 to a protective state such as the head retraction and the disk stop of the HDD 19b, the off state of the heater for the fixing device, the stop of the print job of the printer 13, and the stop of the scanning motor of the scanner 15.

Further, when the recognized target is a person who has shut down the power without executing the normal power-off operation, the controller 11 executes processing for writing the protection data and the important protection data. Then, the controller 11 retracts the head of the HDD 19b to stop the disk. However, the controller 11 executes the protection processing according to the behavior attention level, such as continuing the job being executed, and refraining from stopping operating the printer 13 and the scanner 15.

The method for recognizing the target may be, for example, image recognition using the on-board camera 20c or the external monitoring camera 30.

Furthermore, when the MFP 100 executes user authentication related to billing (for example, user authentication using an IC card or a PIN code), the method of recognizing the target may be a method of using information related to the user authentication.

A target with a high behavior attention level may use the MFP 100. Therefore, in consideration of the convenience of the user, for example, it is possible to adopt protection processing of displaying a usage notice as a message on the display 12 to call the user's attention.

Flow of Protection Processing

Figure 4:
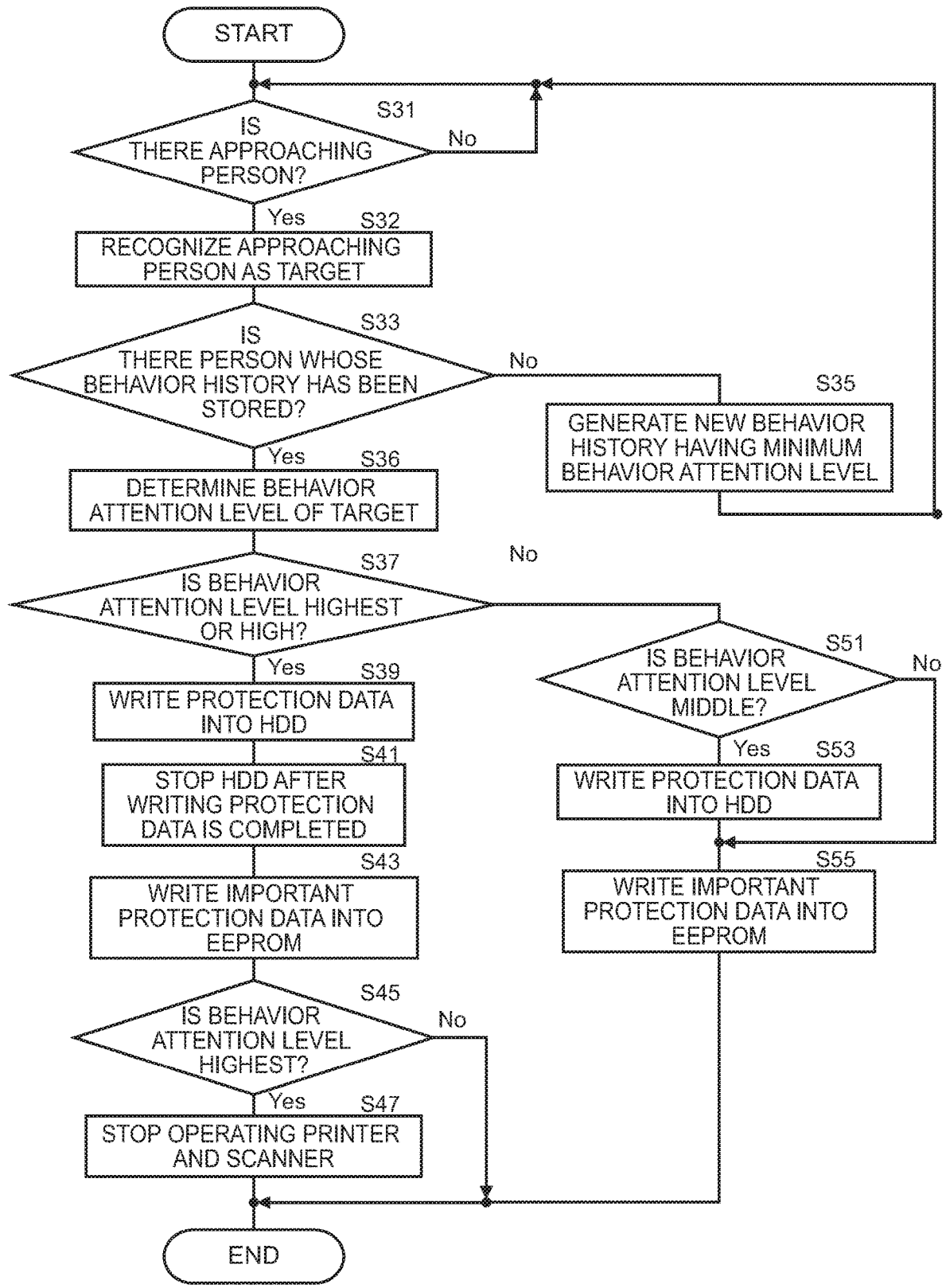
FIG. 4 is a flowchart illustrating an example of protection processing executed by a controller according to a second embodiment.

FIG. 4 is a flowchart illustrating an example of the flow of protection processing executed by the controller 11 according the present embodiment.

As illustrated in FIG. 4, the controller 11 as the detection information acquirer 11a determines whether there is a person who is approaching or has approached the MFP 100 (step S31).

When the controller 11 determines whether there is a person who is approaching or has been approached the MFP 100, the controller 11 as the target recognizer 11c recognizes the person as the target (step S32).

Then, the controller 11 determines whether the recognized target has been recognized in the past and the behavior history has been stored (step S33). Note that, according to the present embodiment, it is assumed that the generated behavior history is stored in the HDD 19b. However, the present embodiment is not limited to the method.

When the behavior history of the recognized target has not been stored (No in step S33), the controller 11 as the history generator 11d generates a new behavior history (step S35). The initial value of the behavior attention level is assumed to be the minimum level (low level) among a plurality of levels.

On the other hand, when the behavior history of the recognized target has been stored (Yes in step S33), the controller 11 as the attention level determiner 11e determines the behavior attention level of the target based on the behavior history stored in the HDD 19b (step S36).

When the behavior attention level is the highest level or the high level (Yes in step S37), the controller 11 as the protection processor 11b stores the protection data into the HDD 19b (step S39). Although not illustrated in FIG. 4, it is preferable to execute writing for each data block as in the first embodiment. However, in case that writing the protection data is completed when the user is approaching the MFP 100, all protection data may be written into the HDD 19b at once.

When the protection data is written into the HDD 19b, the controller 11 as protection processor 11b retracts the head of the HDD 19b to stop the disk (step S41). Then, the controller 11 executes processing for writing the important protection data into the EEPROM 19a (step S43).

After writing the important protection data and the protection data as described above, the controller 11 as the protection processor 11b determines whether the behavior attention level of the target is the highest level (step S45). In the case of the highest level, the controller 11 determines that the recognized target is likely to apply vibration to the MFP 100, and stops operating the MFP 100. That is, the controller 11 stops operating the printer 13 and the scanner 15 (step S47), and ends the processing.

On the other hand, in step S37 described above, when the controller 11 determines that the behavior attention level of the target is not the highest level or the high level, the controller 11 as the attention level determiner 11e determines whether the behavior attention level is the middle level or the low level (step S51).

When the behavior attention level is the medium level, the controller 11 as the protection processor 11b executes processing for writing the protection data into the HDD 19b (step S53). Then, the controller 11 executes processing for writing the important protection data to the EEPROM 19a (step S55). That is, when the behavior attention level is the middle level, the controller 11 executes processing for writing the protection data and the important protection data without stopping the operations of the printer 13 and the scanner 15 or retracting the head of the HDD 19b, and ends the processing.

On the other hand, when the behavioral attention level is the low level in the processing of step S51 described above (No in step S51), the controller 11 as the protection processor 11b executes only the processing for writing the important protection data into the EEPROM 19a (step S55) without executing the processing for writing the protection data into the HDD 19b, and ends the processing.

Third Embodiment

The present embodiment recognizes a target that may add vibration or tilt to the MFP 100, and executes protection processing, similarly to the second embodiment. The difference from the second embodiment is that the target is recognized when entering a store or room such as a convenience store in which the MFP 100 is installed.

The sensor for recognizing the target may be the monitoring camera 30 provided in the store or room in which the MFP 100 is installed. Further, in the case of an office, it is possible to use information provided by an entry and exit system provided in the room in which the MFP 100 is installed.

When the MFP 100 is installed in a store, an employee of the store can handle the MFP 100 carefully, by explaining to the employee that the MFP 100 is a precision machine and is vulnerable to vibration, or the like, and training her/him about the handling. However, the general user who visits the store does not know how to handle the MFP 100, and it is expected that handling by the general user will be rougher than handling by the employee.

Therefore, when a user enters the store, the protection data and the important protection data are written by linking with a sensor that detects the entry to the store, or the monitoring camera at the store. Further, the storage area of the protection data to be written into the HDD 19b may be duplexed. By doing this, for example, even if a defect such as sector damage occurs in one of the duplexed storage areas in the HDD 19b, it is possible to acquire the protection data from the other of the storage areas, which is a normal sector, and restore the one of the storage areas when the MFP 100 is restarted.

As an application example of the present embodiment, data related to the MFP 100 for maintenance may be collected and backed up, based on the detection that a maintenance worker such as a service engineer has entered the store. Otherwise, the MFP 100 is stopped for maintenance and then the maintenance data is collected. In comparison, it is possible to shorten the time for the data collection, and reduce the downtime.

Flow of Protection Processing

Figure 5:
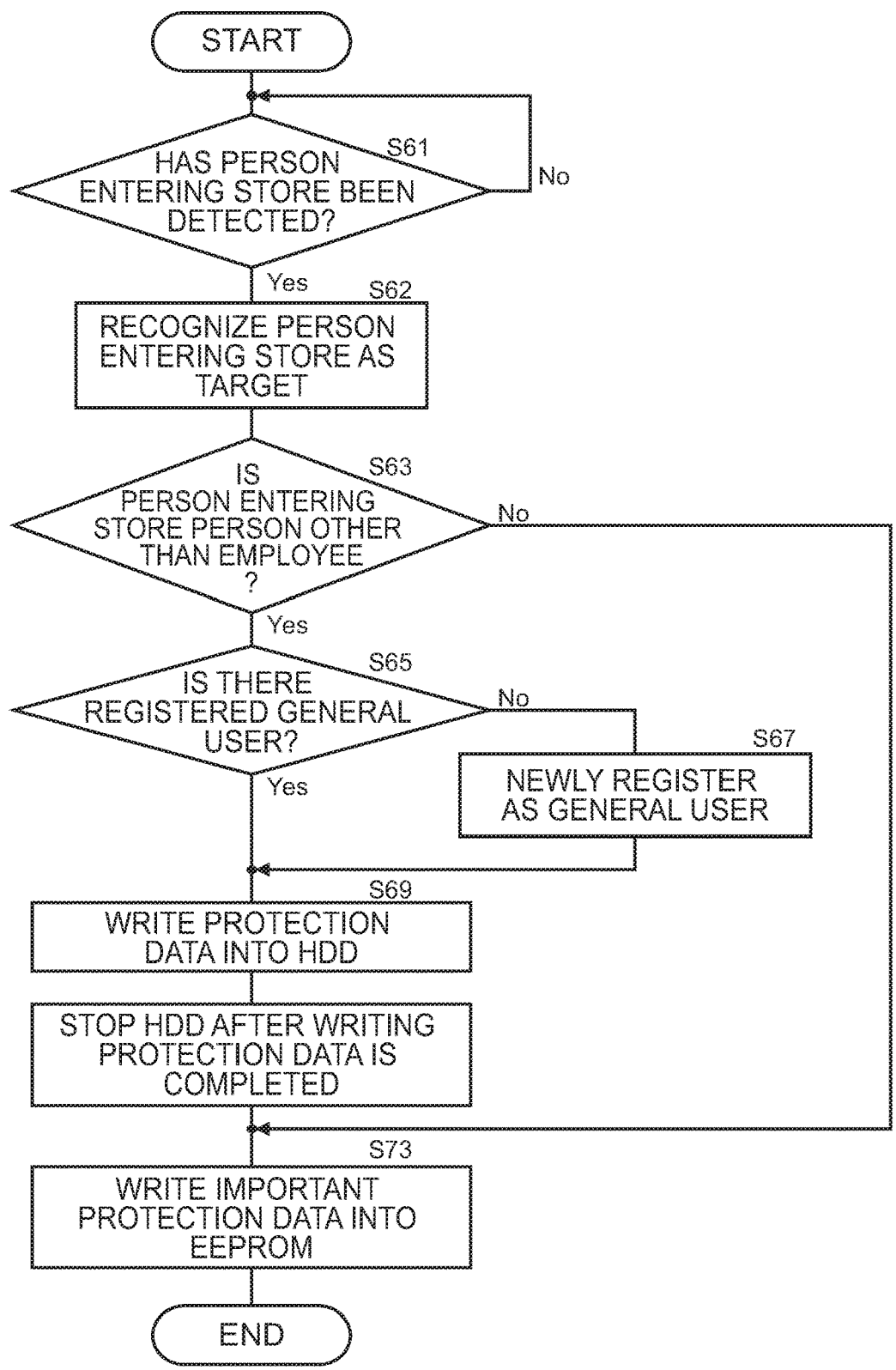
FIG. 5 is a flowchart illustrating an example of protection processing executed by a controller according to a third embodiment.

FIG. 5 is a flowchart illustrating an example of a flow of protection processing executed by the controller 11 according to the present embodiment. In FIG. 5, the processing based on the behavior history may be executed, similarly to FIG. 4. However, since the description thereof is redundant, the processing is omitted in FIG. 5. FIG. 5 is a flowchart focusing on processing different from that in FIG. 4.

As illustrated in FIG. 5, the controller 11 as the detection information acquirer 11a monitors a person entering a store (step S61).

When the controller 11 detects a person entering a store (Yes in step S61), the controller 11 as the target recognizer 11c recognizes the person as a target (step S62).

The controller 11 as the attention level determiner 11e determines whether the person is an employee of the store or a general user other than the employee (step S63).

When the controller 11 determines that the person is an employee (No in step S63), the controller 11 as the protection processor 11b executes the minimum protection processing when the store entry is detected. That is, the controller 11 executes processing for writing the important protection data into the EEPROM 19a (step S73), and ends the processing.

On the other hand, when the controller 11 determines that the person is the general user, the controller 11 as the history generator 11d determines whether the user is a registered general user (step S65).

On the other hand, when the controller 11 determines that the user is an unregistered user (No in step S65), the controller 11 registers the target as a new general user (step S67). Then, the controller 11 as the protection processor 11b executes processing for writing the protection data (step S69).

On the other hand, when the controller 11 determines that the user is already registered, the controller 11 executes processing for writing the protection data without doing anything (step S69).

Note that, as described above, the controller 11 may execute the protection processing to the registered user, based on the behavior attention level as in FIG. 4. FIG. 5 illustrates an embodiment in which the processing is omitted, and it is assumed that the protection data is uniformly written in case of the general user.

When the processing for writing the protection data into the HDD 19b is completed (step S69), the controller 11 as the protection processor 11b retracts the head of the HDD 19b, and stops the disk (step S71).

Then, the controller 11 writes the important protection data into the EEPROM 19a (step S73), and ends the processing.

Fourth Embodiment

The present embodiment is an embodiment in which the configuration of the third embodiment that detects a person entering a store or a room is combined with the configuration of the second embodiment that detects an approach to the MFP 100. That is, the present embodiment is an embodiment in which a person who enters the store or the room is detected as a target, and the protection processing is executed when the target approaches the periphery (warning area) of the MFP 100.

For example, in the case of the MFP 100 installed in a store such as a convenience store, all of the persons do not necessarily approach the MFP 100. In a store where a large number of people enter, the processing load becomes heavy if the protection data and the important protection data are written every time the person is detected. Further, the EEPROM 19*a* may be written over the upper limit of the number of writable times.

On the other hand, in order to accurately recognize the person, it is preferable to use a store monitoring camera having high performance. Therefore, suitable protection may be achieved by combining both of the embodiments.

The present embodiment executes the protection processing when a person who enters the warning area is detected, by only the monitoring camera 30 in the store or linking the monitoring camera 30 and the sensor 20 (for example, the on-board camera 20*c* or a human detecting sensor not illustrated in FIG. 1) in the MFP 100.

Flow of Protection Processing

Figure 6:
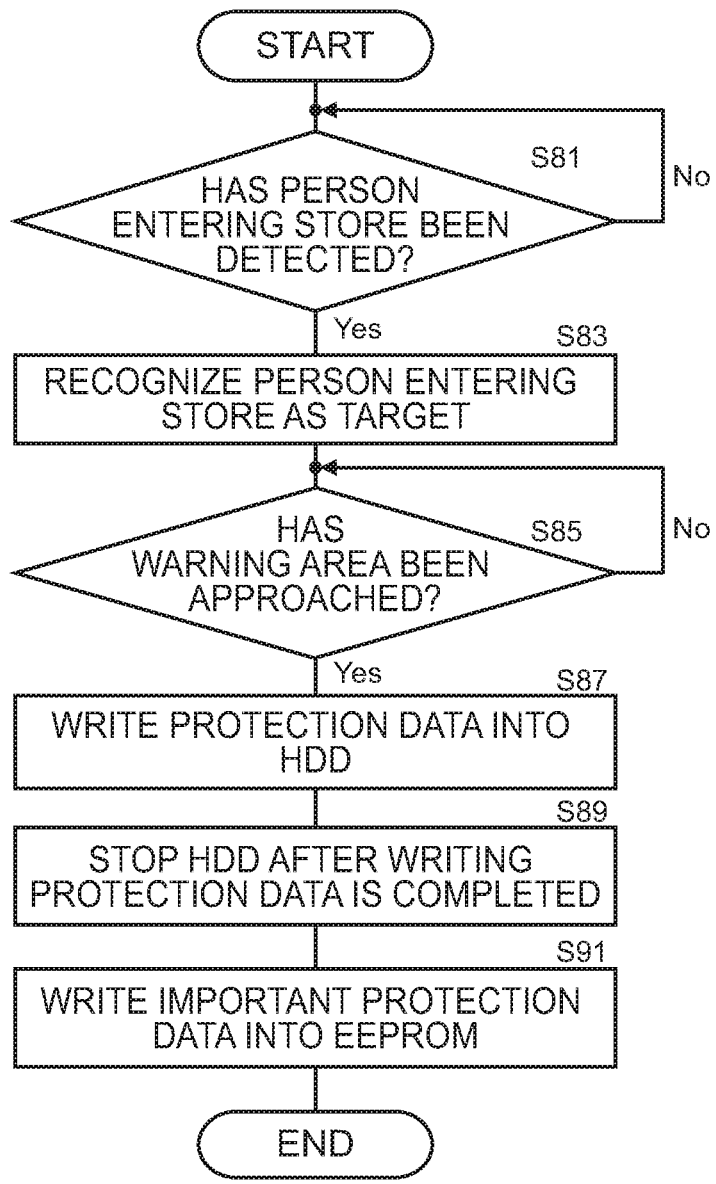
FIG. 6 is a flowchart illustrating an example of protection processing executed by a controller according to a fourth embodiment.

FIG. 6 is a flowchart illustrating an example of a flow of protection processing executed by the controller 11 according to the present embodiment. In FIG. 6, the processing based on the behavior history may be executed, similarly to FIG. 4. However, since the description thereof is redundant, the processing is omitted in FIG. 6. FIG. 6 is a flowchart focusing on processing different from that in FIGS. 4 and 5.

As illustrated in FIG. 6, the controller 11 as the detection information acquirer 11*a* monitors a person entering the store (step S81).

When the controller 11 detects a person entering the store (Yes in step S81), the controller 11 as the target recognizer 11*c* recognizes the person as a target (step S83).

Further, the controller 11 as the target recognizer 11*c* monitors whether the recognized target has approached or entered the warning area (step S85). The warning area is a predetermined area in the periphery of the MFP 100, and the entry into the warning area is detected by the monitoring camera 30 in the store or the sensor 20 of the MFP 100.

When the controller 11 determines that the recognized target has approached or entered the warning area (Yes in step S85), the controller 11 as the protection processor 11*b* executes processing for writing the protection data (step S87).

When the controller 11 completes the processing for writing the protection data into the HDD 19*b* (step S87), the controller 11 as the protection processor 11*b* retracts the head of the HDD 19*b* and stops the disk (step S89).

Then, the controller 11 writes the important protection data into the EEPROM 19*a* (step S91) and ends the processing.

Although not illustrated in FIG. 6, the controller 11 may execute the protection processing to the registered user, based on the behavior attention level, as in FIG. 4. Further, similarly to FIG. 5, the protection processing may be executed by discriminating between an employee and a general user.

Fifth Embodiment

The present embodiment executes protection processing after detecting the disconnection of a power plug. In a first aspect, the sensor 20 has a sensor (not illustrated in FIG. 1) for detecting that a user has gripped a power plug not illustrated in FIG. 1, and the protection processing is executed based on the prediction that the power plug will be unplugged when the sensor detects that the power plug has been gripped during operation.

In a second aspect, the power plug further includes a latch mechanism for preventing the power plug from being detached, and an actuator for actuating the latch mechanism. According to the present embodiment, even if a user tries to unplug the power plug, it is possible to prevent the power plug from being detached, by actuating the latch mechanism by the actuator until the writing of protection data and important protection data is completed.

Some simple home appliances do not have a power switch, and turn on or off the power by inserting or removing the power plug. Regarding the handling of the MFP, as with the handling of the simple home appliances, there is a possibility that a user may pull out the power plug without operating the power switch when cleaning or the like.

According to the present embodiment, when the user grips the power plug to remove the power plug from the outlet, the sensor provided on the power plug detects that the user has gripped the power plug. The controller 11 as the detection information acquirer 11*a* acquires a signal (information) from the sensor, and the controller 11 as the protection processor 11*b* starts the protection processing before the power plug is unplugged, based on the acquired information.

According to the first aspect described above, the controller 11 starts writing the protection data and the important protection data in response to gripping the power plug. For example, it is assumed that the power storage function of the power supply circuit ensures that the operation of the controller 11 and the storage device 19 related to the data writing is guaranteed for a period of 500 milliseconds after the power plug is removed and the power is shut off. In this case, the data that can be written within 500 milliseconds can be referred to as the data guaranteed to be written.

On the other hand, if a grace period of 500 milliseconds is available until the power plug is released after the gripping of the power plug is detected, the data that can be written within 1 second in total can be regarded as the data for which the writing is guaranteed.

Further, according to the second aspect, the latch mechanism is activated to prevent the power plug from being unplugged, and then the processing for writing the protection data and important protection data is executed. When the writing processing is completed, the latch mechanism is released so that the power plug can be pulled out. Therefore, the writing of the protection data and the important protection data is guaranteed.

Generally, the power storage function of the power supply is realized by mounting a large-capacity capacitor or battery in the power supply circuit. In order to increase the holding time of the power supply, a larger-capacity capacitor or battery is required, which leads to an increase in the cost of the power supply circuit.

On the other hand, according to the present embodiment, the power plug includes at least a sensor, and preferably further includes a latch mechanism, the data protection and the storage device protection can be realized without increasing the capacity of the capacitor or the battery even if the power is shut off due to the removal of the power plug.

The sensor for detecting that the power plug has been gripped can be realized by using a known switch or a touch sensor.

The latch mechanism that prevents the power plug from being unplugged requires a structure that mechanically supports the power outlet. However, it is possible to provide a power plug with a latch mechanism and a corresponding outlet as a pair.

Flow of Protection Processing

Figure 7:
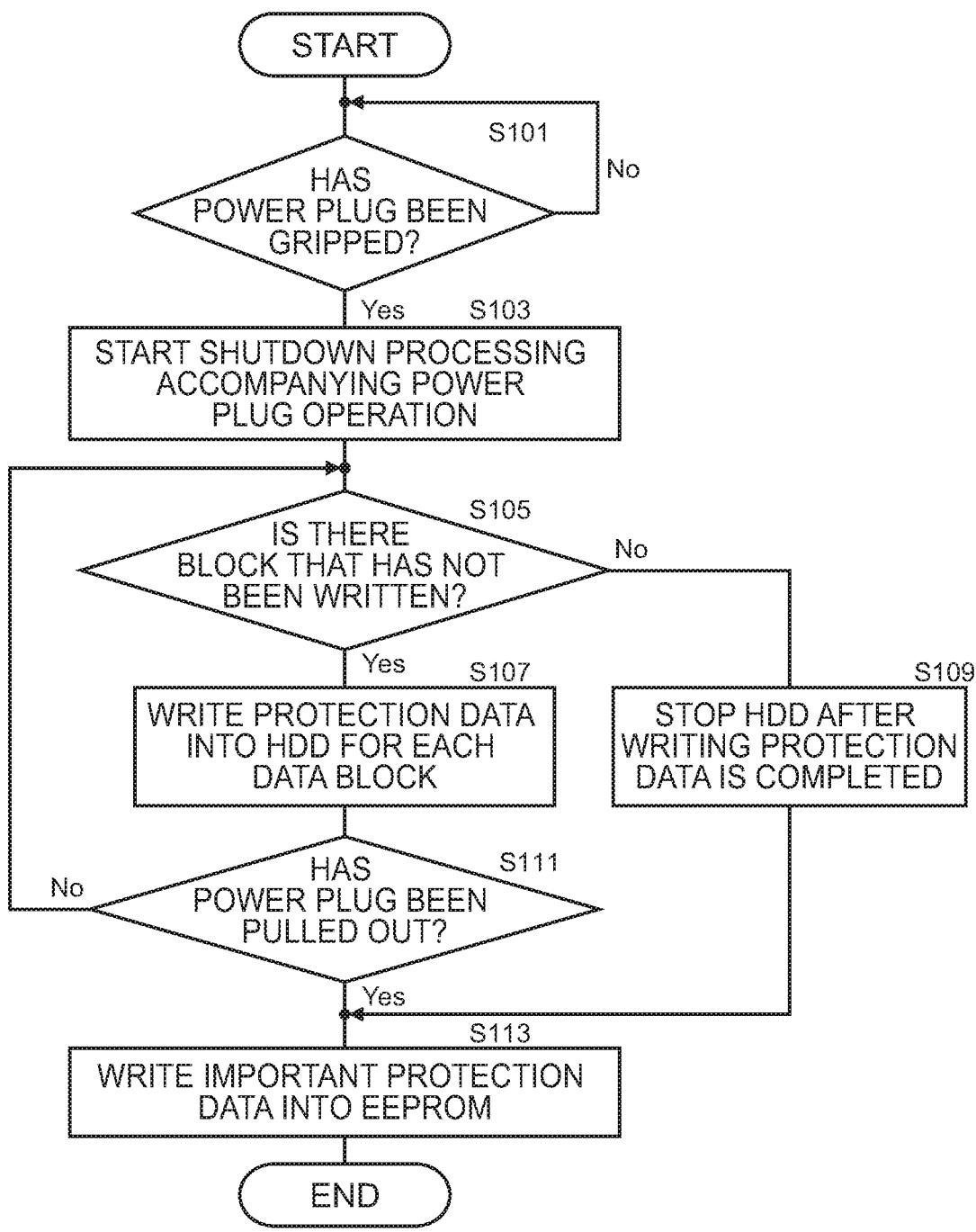
FIG. 7 is a flowchart illustrating an example of protection processing in a first aspect according to a fifth embodiment.

FIG. 7 is a flowchart illustrating an example of a flow of protection processing executed by the controller 11 in the first aspect according to the present embodiment.

Figure 8:
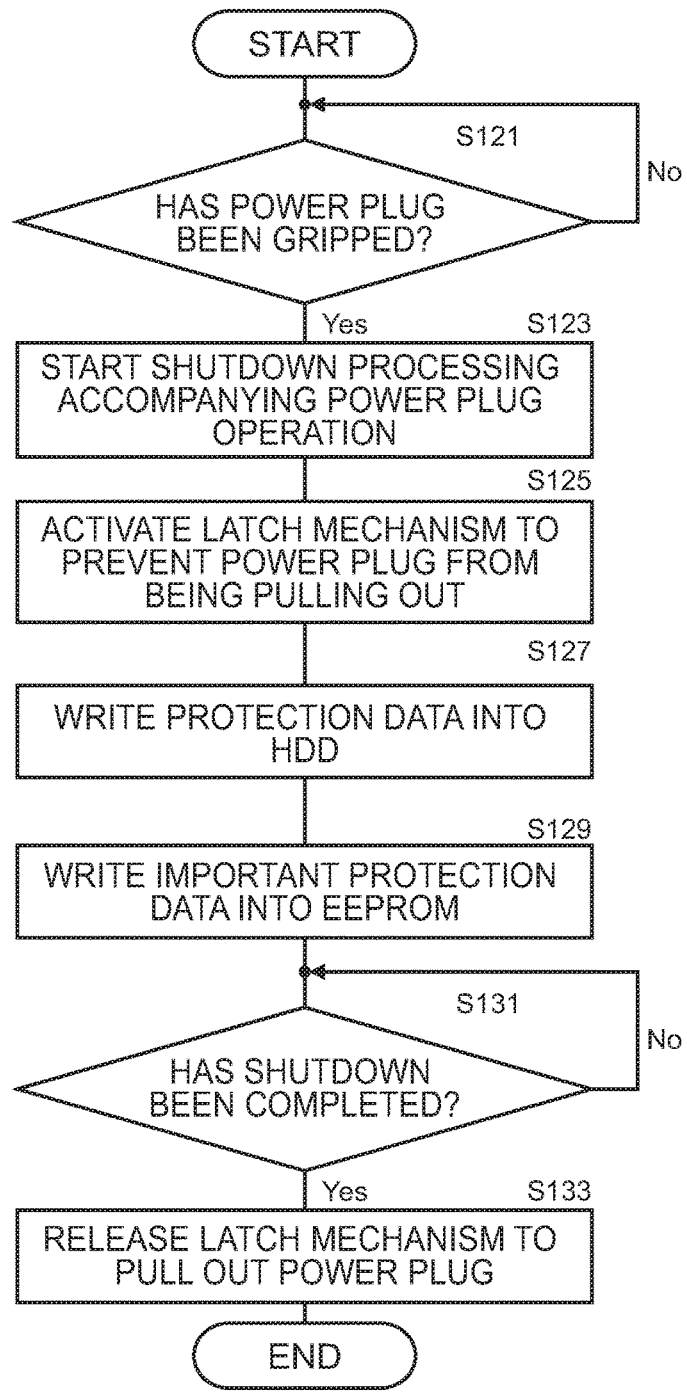
FIG. 8 is a flowchart illustrating an example of protection processing in a second aspect according to the fifth embodiment.

FIG. 8 is a flowchart illustrating an example of a flow of protection processing executed by the controller 11 in the second aspect according to the present embodiment. The processing of the first aspect will be described with reference to FIG. 7.

As illustrated in FIG. 7, the controller 11 as the detection information acquirer 11a monitors whether the power plug has been gripped (step S101). Note that a configuration in which the power plug includes a latch mechanism without an actuator, and the power plug is pulled out by a user manually releasing the latch may be adopted, and a configuration in which the release of the latch mechanism is detected by a switch or the like may be adopted, instead of the grip detection.

When the sensor 20 detects that the power plug has been gripped, the controller 11 as the protection processor 11b starts the shutdown processing accompanying the power plug operation (step S103). That is, the controller 11 stops outputting an output signal that may damage the MFP 100 unless the output is turned off immediately. Further, when the protection data is written, and the power shutdown is detected due to the removal of the power plug, the controller 11 shifts to writing processing of the important protection data even if there is an unwritten data block.

More specifically, when there is an unwritten data block in the protection data to be written (Yes in step S105), the controller 11 writes the next data block into the HDD 19b (step S107). Then, the controller 11 determines whether the power has been shut off due to the removal of the power plug (step S111).

Until the power has been shut off (No in step S111), the routine returns to step S105 described above, and the controller 11 determines whether an unwritten data block remains. That is, the controller 11 executes the processing for writing the protection data for each data block until the power supply plug is removed, and the power is shut off.

When there are no data block to be written (No in step S105), the controller 11 retracts the head of the HDD 19b, and stops the disk (step S109). Then, the controller 11 executes processing for writing the important protection data into the EEPROM 19a (step S113), and ends the processing.

On the other hand, when the power plug is unplugged, and the power is shut off while the protection data is being written to each data block (Yes in step S111), the controller 11 executes processing for writing the important protection data into the EEPROM 19a (step S113), and ends the processing.

As described above, the controller 11 writes the protection data as much as possible, and all the important protection data.

Next, the processing of the second aspect will be described with reference to FIG. 8.

As illustrated in FIG. 8, the controller 11 as the detection information acquirer 11a monitors whether the power plug has been gripped (step S121).

When the sensor 20 detects that the power plug has been gripped, the controller 11 as the protection processor 11b starts the shutdown processing accompanying the power plug operation (step S123). That is, the controller 11 stops outputting an output signal that may damage the MFP 100 unless the output is turned off immediately.

Then, the controller 11 operates the latch mechanism of the power plug so as to prevent the power plug from being pulled off the outlet (step S125).

Then, the controller 11 executes processing for writing the protection data (step S127).

The protection data may be written into the HDD 19b for each data block, but may be written into the HDD 19b collectively, similarly to FIG. 7. This is because a configuration in which the power plug cannot be pulled off until the protection data is completely written into the HDD 19b is employed.

Then, the controller 11 as the protection processor 11b executes processing for writing the important protection data into the EEPROM 19a (step S129).

When the controller 11 completes the processing for writing the important protection data into the EEPROM 19a, and completes the shutdown processing started in step S123 (step S131), the controller 11 as the protection processor 11b releases the latch mechanism so that the user can pull out the power plug (step S133), and ends the processing.

As described above, the controller 11 writes all the protection data, and all the important protection data.

As described above, (i) an image forming apparatus according to the present invention includes a storage device that stores either or both of important protection data and protection data, the important protection data being a type determined to be important in advance, the protection data being to be retained when power is shut off other than the important protection data, among data to be retained when the power is shut off at each predetermined timing, a detection information acquirer that receives detection information from a sensor that detects at least one of a change in either or both of direction and tilt, vibration, a predetermined operation, an approaching person, a person entering a room, and a person entering a predetermined area, and a protection processor that starts processing for writing either or both of the important protection data and the protection data into the storage device responsive to the detection information received by the detection information acquirer, separately from the predetermined timing.

According to the present invention, the important protection data is data of a type predetermined to be particularly important data by a designer of the image forming apparatus, among the data to be retained when the power of the image forming apparatus is shut off. A typical example of the data is data related to billing to a user based on the use of the image forming apparatus. More specific examples of the data are, for example, counter data indicating the total number of sheets used, counter data indicating the number of sheets used by each user (including each department), and the like of the image forming apparatus. The billing counter in the above embodiments corresponds to the important protection data of the present invention.

Further, the protection data related to a state is data other than the above-mentioned important protection data among the data to be retained when the power of the image forming apparatus is shut off. A typical example of the data is data relating to the usage state of the image forming apparatus. A more specific example of the data is, for example, data such as a counter for managing the replacement time of consumables or periodic replacement components used in the image forming apparatus.

Furthermore, the protection data relating to a configuration is data relating to a configuration such as the image quality, the operation timing, and the user interface of the image forming apparatus.

The storage device is a rewritable non-volatile storage device that stores various types of data described above. A typical example of the storage device is an HDD. However, the storage device is not limited to the HDD, and may be, for example, an SSD, a flash ROM, an EEPROM, a magnetic resistance RAM (MRAM), a ferroelectric memory (Fe-RAM), or the like. A single storage device may be configured by combining a plurality of types of storage devices.

Further, the sensor detects a state or an operation in which vibration is applied to the image forming apparatus or the power is shut off, and such a situation is expected.

The specific example of the sensor may be vibration sensor for detecting vibration applied to the image forming apparatus, an acceleration sensor, or a tilt sensor for detecting tilt of the image forming apparatus. Further, a specific means for predicting the situation where vibration is applied to the image forming apparatus or the power is shut off may be a switch that detects that a power outlet is touched as a predetermined operation, and a camera that captures a person approaching the image forming apparatus, in connection with the behavior of unplugging a power plug from the power outlet. The camera may be equipped with an image forming apparatus. However, the camera may be placed around the place where the image forming apparatus is installed.

Further, the detection information acquirer receives the detection information from the various sensors described above. The specific aspect includes hardware resources including as a CPU, which is a main component, a ROM, a RAM, an input interface circuit, a communication circuit and the like, and the CPU executes a control program stored in the ROM in advance, thereby realizing the function. The hardware resources may be common to the protection processor, which will be described later.

The protection processor executes protection processing for the important protection data and protection data described above. Further, the protection processor executes protection processing for the storage devices. The specific aspect includes hardware resources, such as a CPU, which is a main component, an ROM, a RAM, an input and output interface circuit, and a communication circuit, and the CPU executes a control program stored in the ROM in advance, thereby realizing the function. The hardware resources may be common to the above-described detection information acquirer.

The protection processor predicts that the image forming apparatus will be vibrated or the power will be shut off based on the detection information from the sensor in the image forming apparatus or an external sensor, and starts processing for writing either or both of the important protection data and the protection data into a storage device. Then, the protection processor completes to write the data before the image forming apparatus is vibrated or the power is shut off, thereby reducing the risk that the data or the storage device will be corrupted or damaged.

(ii) The image forming apparatus according to the present invention further may include a target recognizer that recognizes a person related to at least any one of an approaching person, a person entering a room, and a person entering a predetermined area, as a target, based on the detection information, a history generator that stores a behavior related to the target into the storage device as a behavior history in association with the target, and an attention level determiner that determines a behavior attention level of the target based on the behavior history stored in the storage device, regarding the target recognized by the target recognizer, the protection processor may determine a range of processing for writing into the storage device in response to the behavior attention level determined for the target.

According to this configuration, the image forming apparatus according to the present invention can determine the range of the processing for writing the storage device in accordance with high or low of the level of the behavioral attention level of the target. For example, when a target having a high behavior attention level is recognized, it is possible to write more data to the storage device by determining that there is a high possibility that vibration will be applied to the image forming apparatus or the power will be shut off. For example, even if an EEPROM or the like is used for at least a part of the storage device and it is not preferable to excessively write to the storage device from the viewpoint of the life of the storage device, it is possible to determine the writing range according to the behavior attention level of the target, and suppress unnecessary writing.

(iii) When the target recognizer recognizes the target during image formation, the protection processor may determine whether to stop at least a part of an operation related to the image formation, in accordance with the behavior attention level, in addition to the range of processing to be stored into the storage device.

According to this configuration, when a target with a high behavior attention level is recognized, it is possible to determine that there is a high possibility that vibration will be applied to the image forming apparatus or the power will be shut off, and stop the operation of other components of the image forming apparatus to reduce the risk of breakage, in addition to the protection processing to the data and the storage device.

(iv) In case of stopping at least the part of the operation related to the image formation, the protection processor may determine an aspect of an operation to be stopped according to the behavior attention level.

According to this configuration, it is possible to determine an aspect of stopping the operation related to the image formation in accordance with high or low of the behavior attention level of the target. For example, when a target having a high behavior attention level is recognized, printing the page in progress and subsequent pages is stopped. On the other hand, when a target having a moderate behavior attention level is recognized, a part of pages in progress is continued to be printed so as to complete to print the part of the pages, and the other part of the pages in progress is stopped.

Further, when a target having a high behavior attention level is recognized, all the jobs in progress are stopped. However, when a target having a moderate behavior attention level, print jobs that use a heat source for fixing may be stopped for safety, and jobs for scanner and facsimile that do not use the heat source may be continued to operate.

(v) The image forming apparatus further may include a sensor that detects at least one of a change in either or both of direction and a tilt, an approaching person, a person entering a room, and a person entering a predetermined area, and outputs the detection information, or the detection information acquirer may acquire the detection information from an external sensor.

With this configuration, it is possible to predict that the image forming apparatus will be vibrated or the power will be shut off by using the sensor provided in the image forming apparatus, the external sensor, or both of them.

(vi) The image forming apparatus according to the present invention further may include a power plug that is coupled to a power system to obtain power, and that includes a latch mechanism that prevents a detachment, and an actuator that operates and releases the latch mechanism, the protection processor may control the actuator to allow the latch mechanism to be operated while writing either or both of the important protection data and the protection data into the storage device.

According to this configuration, the disconnection of the power plug can be prevented at least during the period of writing the important protection data or the protection data into the storage device, so that the power shutdown due to the disconnection of the power plug can be prevented. Therefore, the data and the storage device can be prevented from being corrupted or damaged.

(vii) In another aspect of the present invention, a data protection method by a controller for an image forming apparatus, includes writing either or both of important protection data and protection data into a storage device, the important protection data being a type determined to be important in advance, the protection data being to be retained when power is shut off other than the important protection data, among data to be retained when the power is shut off at each predetermined timing, receiving detection information from a sensor that detects at least one of a change in either or both of direction and tilt, vibration, a predetermined operation, an approaching person, a person entering a room, and a person entering a predetermined area, and starting processing for writing either or both of the important protection data and the protection data into the storage device responsive to the detection information, separately from the predetermined timing.

The preferred embodiment of the present invention also includes any combination of the plurality of embodiments described above.

In addition to the above-mentioned embodiments, there may be various modifications of the present invention. These modifications should not be construed as not belonging to the scope of the present invention. The present invention should be construed as including the meaning equivalent to the scope of the claims and all the modifications within the scope.

DESCRIPTION OF THE REFERENCE NUMERALS

10 OPERATOR
11 CONTROLLER
11A DETECTION INFORMATION ACQUIRER
11B PROTECTION PROCESSOR
11C TARGET RECOGNIZER
11D HISTORY GENERATOR
11E ATTENTION LEVEL DETERMINER
12 DISPLAY
13 PRINTER
14 COMMUNICATION INTERFACE CIRCUIT
15 SCANNER
16 IMAGE DATA GENERATOR
17A SHEET FEED TRAY
17B MANUAL FEED TRAY
18A, 18B, AND 18C DISCHARGE TRAY
19 STORAGE DEVICE
19A EEPROM
19B HDD
20 SENSOR
20A VIBRATION SENSOR
20B TILT SENSOR
20C ON-BOARD CAMERA
21 POWER SUPPLY CIRCUIT
30 MONITORING CAMERA
100 MFP

What is claimed is:

1. An image forming apparatus, comprising:
a storage device that stores, from among data to be retained when power is shut off, either or both of important protection data, being a type determined to be important in advance, and protection data to be retained when the power is shut off other than the important protection data at respective predetermined timings;
a detection information acquirer that receives detection information from a sensor that detects at least one of a change in either or both of direction and tilt, vibration, a predetermined operation, an approaching person, a person entering a room, and a person entering a predetermined area;
a target recognizer that recognizes, based on the detection information, a person as a target in relation to at least any one of an approaching person, a person entering a room, and a person entering a predetermined area;
a history generator that stores a behavior related to the target into the storage device as a behavior history in association with the target;
an attention level determiner that determines a behavior attention level of the target based on the behavior history stored in the storage device, regarding the target recognized by the target recognizer; and
a protection processor that starts processing for writing either or both of the important protection data and the protection data into the storage device in response to the detection information received by the detection information acquirer, at timings different from the predetermined timings,
wherein the protection processor determines a range of processing for writing into the storage device in response to the behavior attention level determined for the target.

2. The image forming apparatus according to claim 1, wherein when the target recognizer recognizes the target during image formation, the protection processor determines whether to stop at least a part of an operation related to the image formation, in accordance with the behavior attention level, in addition to the range of processing for writing into the storage device.

3. The image forming apparatus according to claim 2, wherein in case of stopping at least the part of the operation related to the image formation, the protection processor determines an aspect of an operation to be stopped according to the behavior attention level.

4. The image forming apparatus according to claim 1, wherein the image forming apparatus further comprises a sensor that detects at least one of a change in either or both of direction and tilt, an approaching person, a person entering a room, and a person entering a predetermined area, and outputs the detection information, or
wherein the detection information acquirer acquires the detection information from an external sensor.

5. The image forming apparatus according to claim 1, further comprising a power plug coupled to a power system to obtain power, the power plug including a latch mechanism that prevents a detachment, and an actuator that operates and releases the latch mechanism, wherein the protection processor controls the actuator to allow the latch mechanism to be operated while writing either or both of the important protection data and the protection data into the storage device.

6. A data protection method for an image forming apparatus, comprising:

using a controller of the image forming apparatus to write, from among data to be retained when power is shut off, either or both of important protection data, being a type determined to be important in advance, and protection data to be retained when the power is shut off other than the important protection data, into a storage device at respective predetermined timings;

receiving detection information from a sensor that detects at least one of a change in either or both of direction and tilt, vibration, a predetermined operation, an approaching person, a person entering a room, and a person entering a predetermined area;

recognizing, based on the detection information, a person as a target in relation to at least any one of an approaching person, a person entering a room, and a person entering a predetermined area;

storing a behavior related to the target into the storage device as a behavior history in association with the target;

determining a behavior attention level of the target based on the behavior history stored in the storage device, regarding the target recognized by the target recognizer; and starting processing for writing either or both of the important protection data and the protection data into the storage device in response to the detection information received, at timings different from the predetermined timings, wherein the controller determines a range of processing for writing into the storage device in response to the behavior attention level determined for the target.

* * * * *